Figure 1:
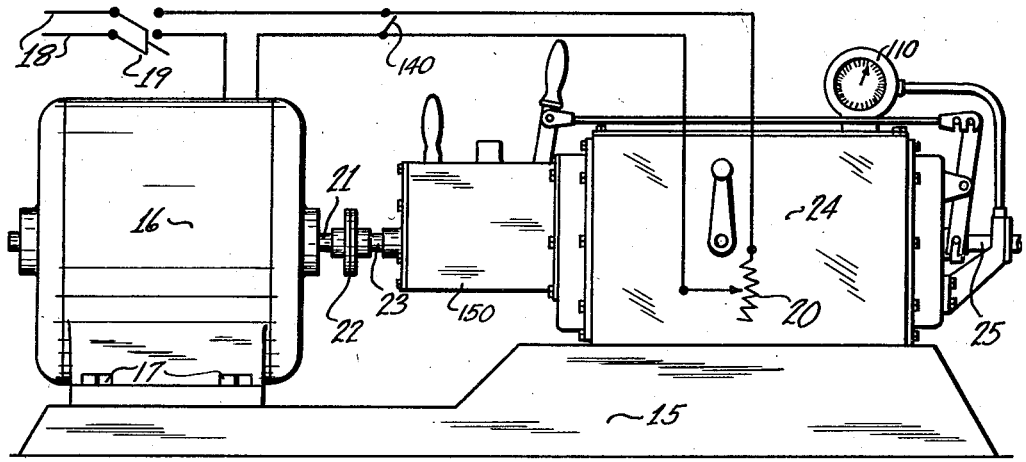

April 16, 1935.  E. S. BUSH  1,997,855
SPEED CHANGE UNIT
Original Filed Feb. 23, 1933  5 Sheets-Sheet 1

INVENTOR.
EUGENE S. BUSH
ATTORNEY.

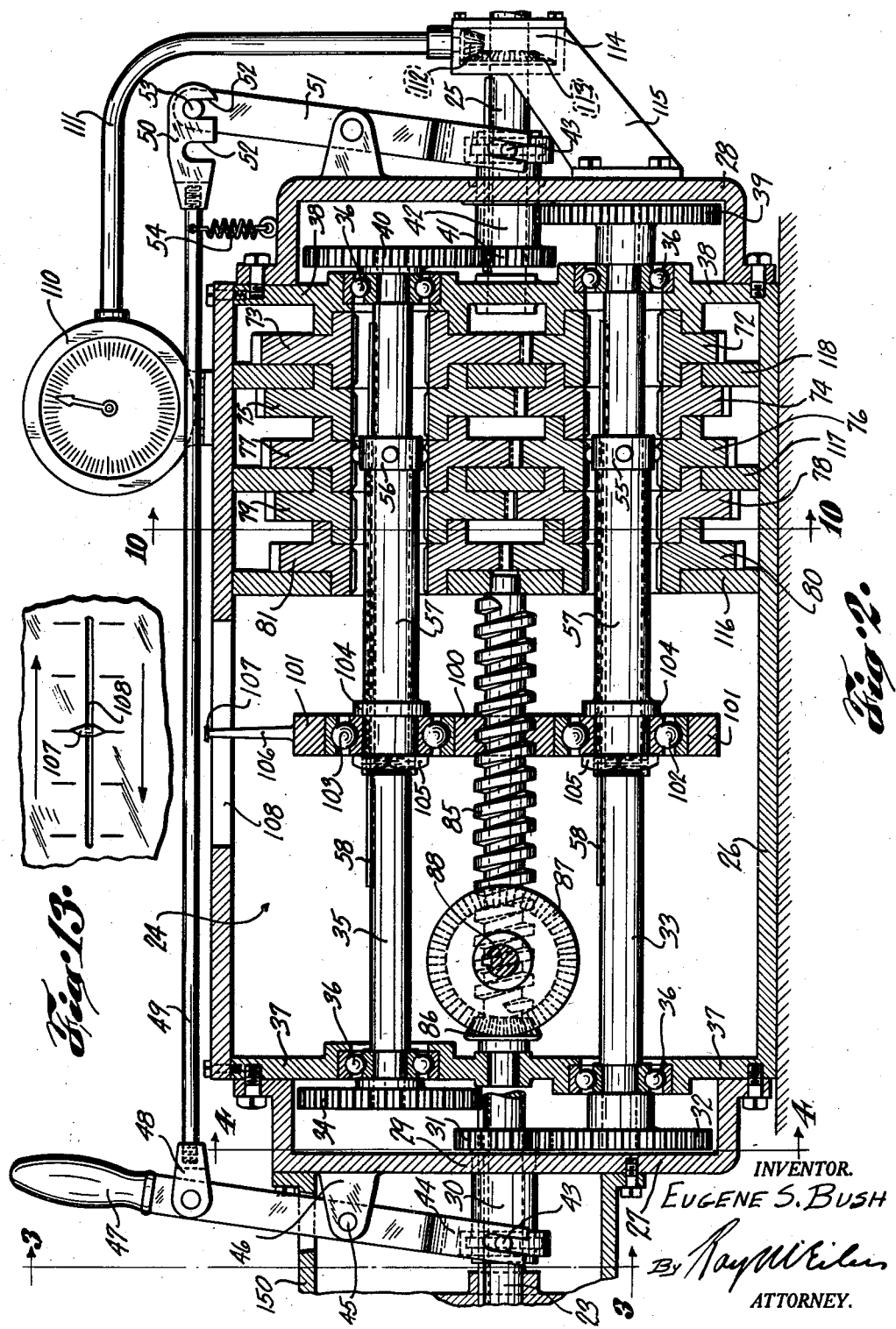

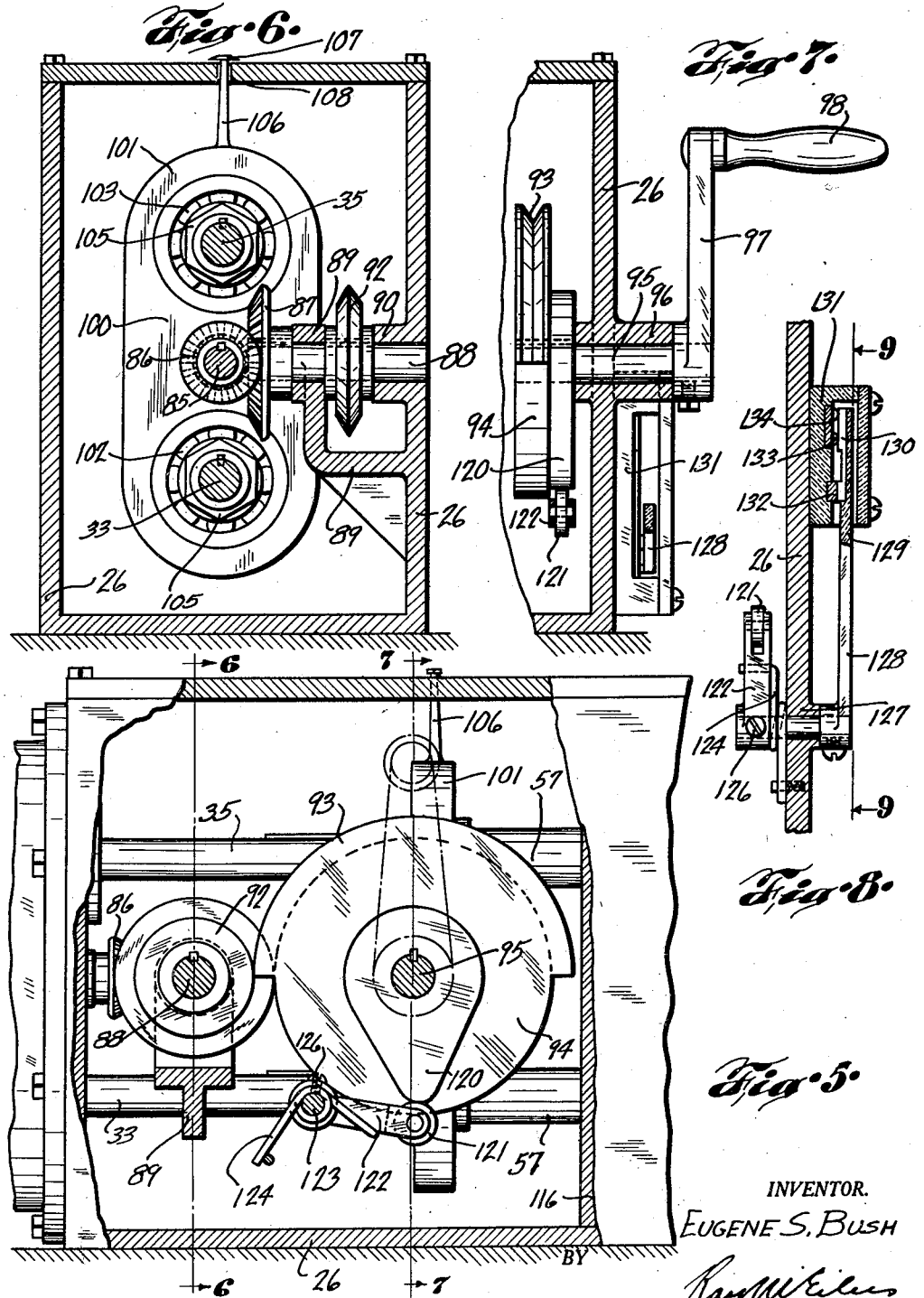

April 16, 1935.   E. S. BUSH   1,997,855
SPEED CHANGE UNIT
Original Filed Feb. 23, 1933   5 Sheets-Sheet 4
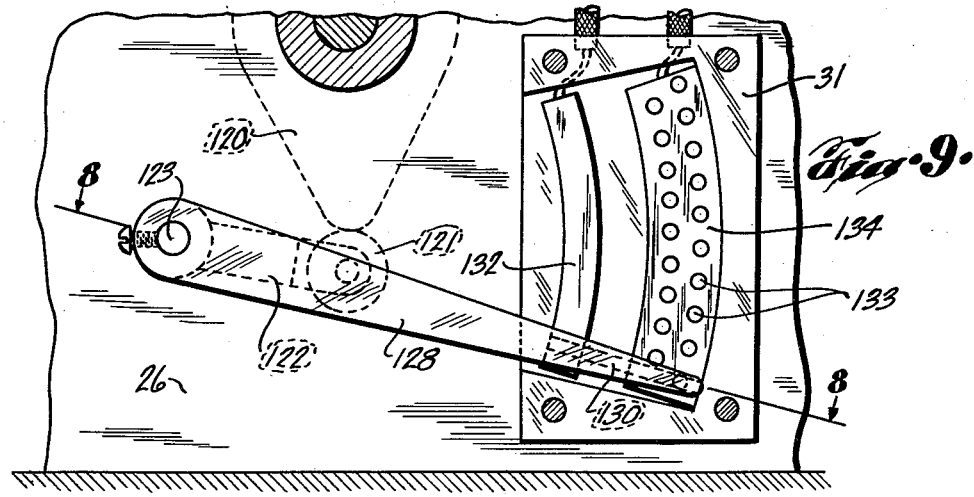
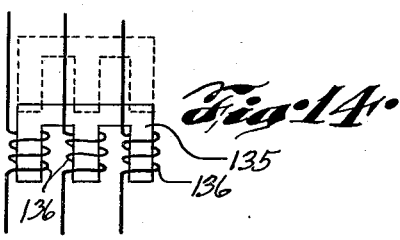
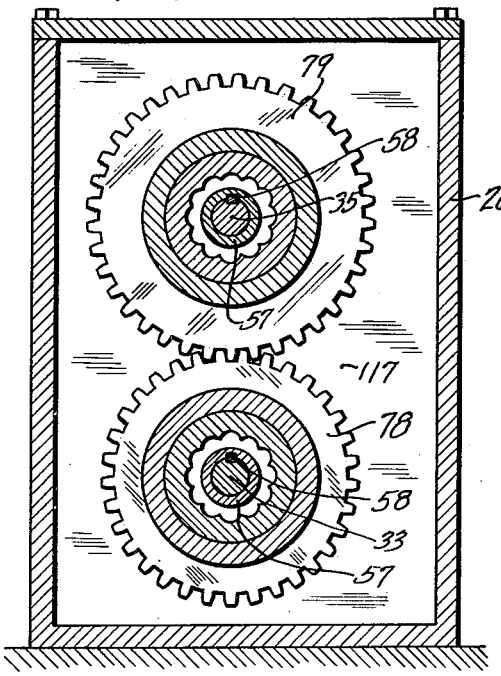
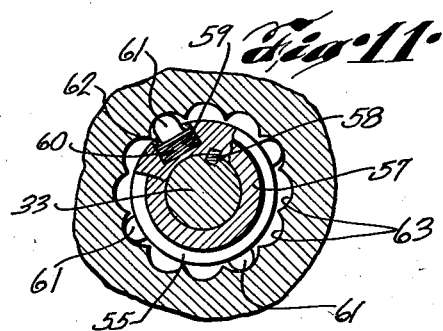
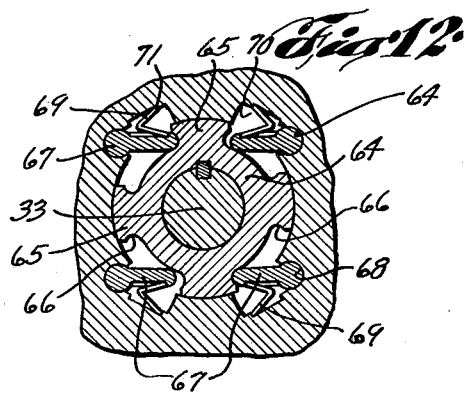
INVENTOR.
EUGENE S. BUSH
BY
ATTORNEY.

April 16, 1935. E. S. BUSH 1,997,855
SPEED CHANGE UNIT
Original Filed Feb. 23, 1933 5 Sheets-Sheet 5

INVENTOR.
EUGENE S. BUSH
BY Roy M Eilers
ATTORNEY.

Patented Apr. 16, 1935

1,997,855

UNITED STATES PATENT OFFICE 1,997,855

SPEED-CHANGE UNIT

Eugene S. Bush, St. Louis, Mo., assignor to Bush Manufacturing Company, St. Louis, Mo., a corporation of Missouri Original application February 23, 1933, Serial No. 657,938. Divided and this application June 7, 1933, Serial No. 674,617

14 Claims. (Cl. 74—358)

This invention relates to improvements in speed change units, and particularly to speed control equipment adapted for use to enhance the range of speeds available from a prime mover, such as an engine or electric motor, possessing but a limited range of speed control by variation of its own energy input.

The present invention constitutes a division of my Patent 1,985,017 granted December 18, 1934, entitled Variable-speed transmission apparatus.

An object of the present invention is attained in a speed change unit for use in transmitting power from an engine or electric motor, and providing a substantially greater variation of speed ratios, between wide limits, than is attainable with heretofore prevailing transmissions employing a comparable number of speed-change gears or equivalent parts.

Yet another object of the invention consists in the provision of a mechanical transmission, which may be of gear type, whereby the heretofore prevailing idle rotation of a number of the gears is avoided; this object being attained through the operation of only those gearing elements through which power is actually transmitted, thus considerably reducing heretofore prevailing frictional and other mechanical losses incident to many of the older types of transmission units.

Yet another object of the invention is attained through facilities such that a number of gears are related in engaged or engageable pairs; also such that either gear of each of such pairs may be employed as a driving element or as a driven element, and whereby each of such pairs of gears or equivalent members provides for two different speed ratios through the transmission.

Yet another object of the invention is attained in an improved gear- and shaft-clutching arrangement embodying in its combination of parts, an overload releasing feature.

A still further object of the invention consists in the provision of a novel means of reversing the rotation of a drive or other shaft, such as to render any of the speed ratios provided for by the transmission, available in either direction of rotation of the parts.

An additional object is attained in the provision of a mechanical speed-change unit of a design which is particularly adaptable for use with a coordinated control of the input energy of an associated prime mover so as to provide what is, for practical purposes, an infinite variation of speed of a power takeoff member, in either direction of rotation, in a unit which may embody or be driven by a unidirectional, substantially constant-speed prime mover, such as an electric motor.

Figures 3, 4:
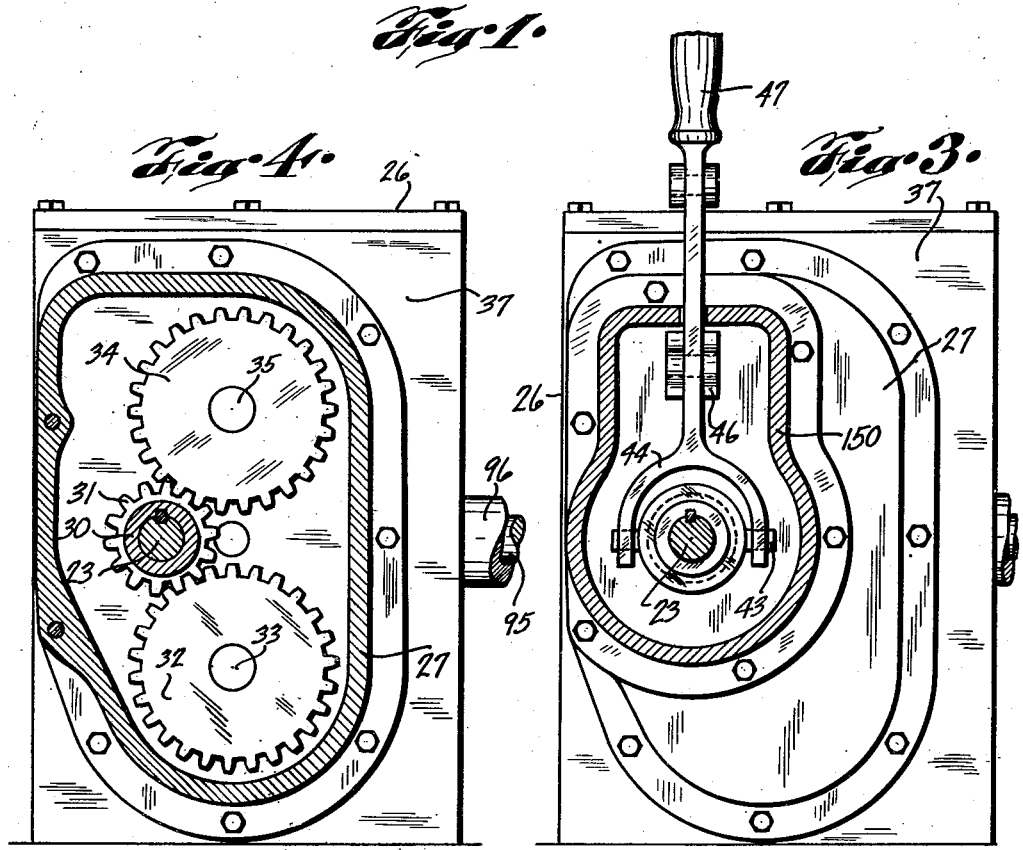
Figure 15:
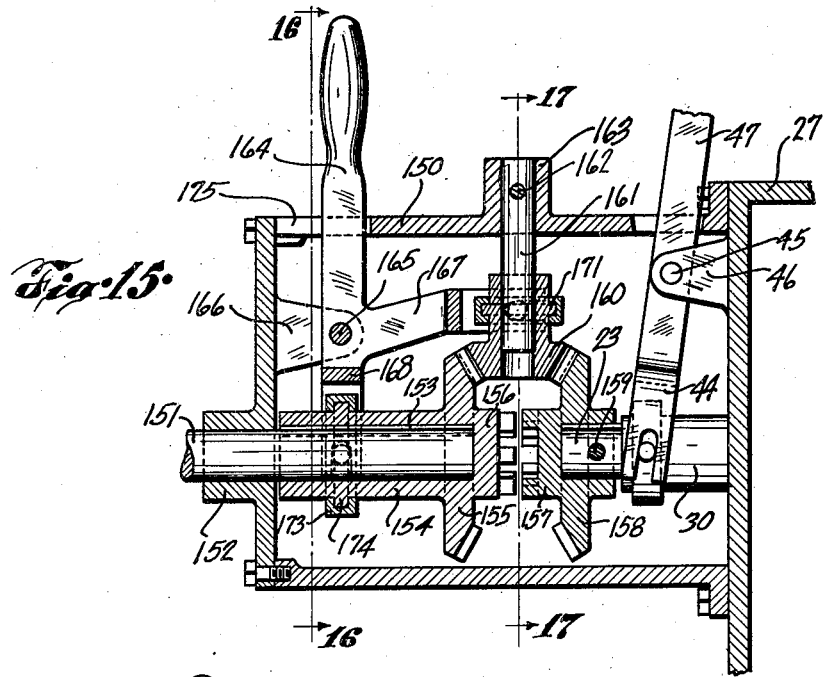
Figure 16:
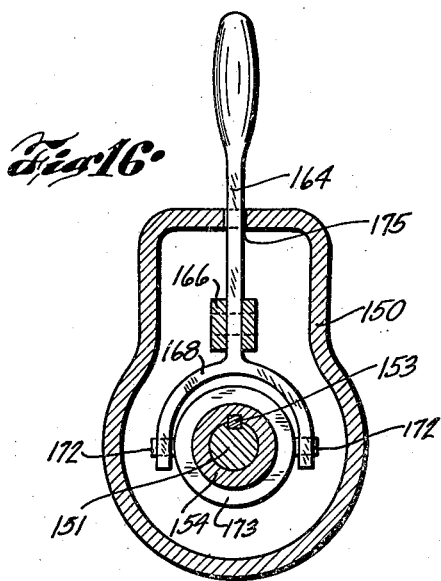
Figure 17:
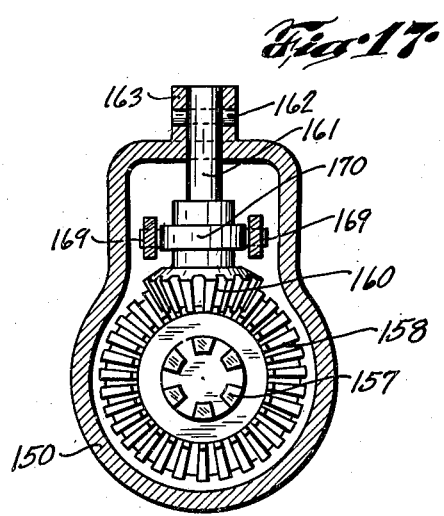

The foregoing and other objects will more fully appear upon a consideration of the ensuing description of a preferred embodiment of the invention, in connection with the accompanying drawings, in which:

Fig. 1 is a side elevation of a motor and transmission unit which may be of semi-portable type, and shown as mounted on a common base member; Fig. 2 is a longitudinal vertical sectional elevation through the transmission assembly of Fig. 1; Fig. 3 is a vertical sectional end elevation transversely of the assembly, as viewed along line 3—3 of Fig. 2; Fig. 4 is a vertical transverse sectional elevation as viewed along line 4—4 of Fig. 2; Fig. 5 is a vertical sectional elevation as viewed transversely of the transmission case, and showing certain elements of the control assembly; Fig. 6 is a transverse sectional elevation through the transmission case as viewed along line 6—6 of Fig. 5; Fig. 7 is a fragmentary vertical section as viewed along line 7—7 of Fig. 5; Fig. 8 is a fragmentary horizontal sectional elevation through the electrical control mechanism; Fig. 9 is a side elevation of the structure of Fig. 8, the relation of Figs. 8 and 9 being indicated by lines 8—8 and 9—9 respectively of the two figures; Fig. 10 is a vertical transverse sectional elevation as viewed along line 10—10 of Fig. 2; Figs. 11 and 12 illustrate, respectively, transverse sections through gear clutches of differing types employed for selectively interconnecting the paired gears of the transmission of Fig. 2, with the shafting of the transmission unit; Fig. 13 is a fragmentary plan view of the cover for the transmission case, illustrating a control-indicating device serving as a visible index to the several placements of the transmission control elements; Fig. 14 is a partly schematic showing of a modified form of electrical motor speed control; Fig. 15 is a longitudinal vertical sectional elevation through a reversing gear assembly such as may optionally be employed in connection with the structure of Fig. 1, and Figs. 16 and 17 are vertical, transverse sectional elevations of the reverse gear unit, as viewed respectively along the lines 16—16 and 17—17 of Fig. 15.

In order better to coordinate the subject matter of the present specification with the disclosure of my copending application above referred to, the same reference numerals are employed in the present description insofar as applicable to the structure of both disclosures. Those elements characterizing the electrical and electro-mechanical control features of the invention, are here included only for the sake of completeness, and are claimed in the copending application.

Referring now by characters of reference to the drawings, the complete unit is shown as including a mounting support or base 15, at or near one end of which is secured a motor 16 as by cap screws 17, the motor being energized through a junction box or other terminal connecting expedient (not shown) from leads or mains 18, the motor circuit being conveniently provided with a switch 19, and at least one of the legs of the circuit beyond the switch 19 being provided with a suitable line-energy control means, such as a rheostat indicated diagrammatically at 20 in Fig. 1, and hereinafter described in more detail. A motor shaft 21 is shown as connected through a flexible coupling 22 or its equivalent, to a power input shaft 23 of a mechanical transmission unit indicated generally at 24 (Fig. 1). The unit 24 is provided, conveniently at its opposite end, with a power take-off shaft 25, which serves to carry and actuate a power take-off pulley or gear (not shown) through which connection is had to any mechanism suitable to be driven by the unit.

The transmission unit 24 comprises a case 26 which is preferably oil-tight and so may serve to contain a supply of lubricant kept at a suitable level, for the purpose of splash-oiling the gearing and other parts within the case. The case 26 is preferably rectangular in transverse section, the body of the case being open at the ends, and the otherwise open ends being closed by plates 27 and 28. The end plate 27 may be provided with a suitable journal portion 29 in which is rotatably mounted the shaft 23, the journal portion serving to receive internally thereof, but externally of the shaft 23, an axially movable gear-shifting sleeve 30, to the end of which, and within the case, is secured a pinion 31 of somewhat smaller diameter than, and enmeshing with a gear 32 keyed or otherwise fixedly secured to a transmission shaft 33. A gear similar to the gear 32 is indicated at 34 and located at the same general end of the unit, the gear 34 being, by preference, of a diameter uniform with that of gear 32 and secured as by a key or other means to a transmission shaft 35. The shafts 33 and 35, which may be considered as transmission countershafts, extend in parallel relation over the greater part of the length of the case, the two shafts being journaled at their opposite corresponding ends as in anti-friction bearings 36, carried by a bracket or bearing arm 37, at one end, and 38 at the opposite end. The brackets 37 and 38 may be formed, if desired, as integral parts of the body of the case 26 or may consist of separable partition elements detachably secured thereto.

The shaft 33 is provided at its end opposite the gear 32 with a corresponding gear 39, and the shaft 35 is likewise provided at its right hand end (Fig. 2) with a gear 40, which may be of the same diameter and other characteristics as the gears 32, 34 and 39. Shown as enmeshing with the gear 40 in Fig. 2 is a pinion 41 which may be of a diameter and other characteristics the same as pinion 31, the pinion 41 being secured to a shiftable sleeve 42, like the sleeve 30, the sleeve 42 overlying and being keyed to the power take-off shaft 25. It will have been observed from Fig. 2 that shaft 35 is of somewhat lesser length than shaft 33, so that the gears 32 and 34, and the gears 39 and 40 are respectively staggered endwise of the unit and thus only one of these gears at a given end of the case is engageable at one time by the pinion 31; likewise only one of the gears at the opposite end of the case is engageable at a given time by pinion 41.

Provision is made, through the sleeves 30 and 42, for concurrently shifting the pinions 31 and 41, by providing each of the sleeves with diametrically extended trunnions 43, whereby each sleeve is shiftably engaged by the slotted ends of a shifting fork. The fork at one end of the assembly is indicated at 44 and is pivoted as at 45, to an arm or lug 46, the fork 44 being extended outwardly to provide a handled lever portion 47. The lever 47 is pivotally connected by a yoke 48, to a reciprocal rod 49, and this rod connected through a notched yoke 50 to a shifting lever 51, which conveniently corresponds to the element 44—47, except for the omission of the handle. As appears from Fig. 2, the yoke 50 is provided with two spaced undercut notches 52 adapted selectively for the reception of and pivoted engagement with a pin 53 carried by the outer end of arm 51. A spring 54 is anchored at one end to the case and at the other end to the rod 49, and serves to keep the selected notch 52 of the yoke 50 in operative connection with the pin 53. The normal position of the yoke 50 with respect to the arm 51 and pin 53 is as shown in Fig. 2, wherein the parts are arranged to permit of selection of the several speed ratios through the transmission. It will have appeared possible to dispose the pin 53 in the opposite notch 52 to cause engagement of the pinion 41 with the gear 39, while pinion 31 is in mesh with gear 32. In the latter case the driven shaft 25 is actuated at the same speed as drive shaft 23, since the reduction between gears 31—32 is, according to preference, compensated for by the speed increase due to the ratio between gears 39 and 41. The latter arrangement is utilized only when it is desired to drive the shaft 25 at the speed of the prime mover. It will clearly appear from Fig. 2 that with the control handle 47, shifting lever 51, etc., in the positions shown, the pinion 31 engages gear 32 and pinion 41 engages gear 40, and as hereinafter appears, with the parts thus arranged, the range of speed ratios obtainable through the transmission is available. Thus assuming the motor shaft 23 to be rotated in a given direction, the shaft 23 becomes, as far as the transmission proper is concerned, the driving shaft, and through the speed change gear train, hereinafter described, serves to actuate shaft 25 as a driven shaft. The path of the driving energy is thus from shaft 23, through gears 31, 32, shaft 33, thence through the speed change gear train to shaft 35, gear 40, and pinion 41, to the power take-off shaft 25, all in the order named.

It will appear, however, that when the lever 44 is moved to the left (Fig. 2), due to shifting of pinion 31 to the right and into engagement with gear 34, driving actuation takes place from shaft 23 through gears 31, 34 and shaft 35 as a driving transmission element. The shaft 35, through the speed change gear train, now serves to actuate shaft 33 as a driven transmission element. Pinion 41 having been shifted concurrently with pinion 31, power is transmitted through gears 39 and 41, to the power take-off shaft 25.

Proceeding now to a description of the speed change gearing associated with shafts 33 and 35, there is provided on each of these shafts, a gear clutch or driving head, such as 55 on shaft 33, and 56 on shaft 35. The heads 55 and 56 are carried each by a sleeve 57, splined or keyed to the associated shaft. The heads may be formed as integral parts of the associated sleeves, or formed separately and secured to the sleeves. According to the capacity and torque requirements of the unit these gear clutches may take either of the forms illustrated by Fig. 11 or 12.

In Fig. 11 the gear clutch is shown as including a sleeve 57, keyed as by a locking element 58 to the shaft such as 33. The gear clutching portion of the sleeve is provided with one or more radial recesses, one of which is shown at 59, serving to contain a spring 60 which urges outwardly a plunger 61, provided with a convexly rounded outer end, and restrained in its outer movement as by a plug 62 which may be threaded into the outer end of the recess 59. Each of the individual gears of the train is arranged to be internally engaged by the gear clutch, and is provided with a central or axial bore, characterized, according to Fig. 11, by a scalloped inner periphery, the individual indents 63 of which are rounded to conform generally to the outer ends of the plungers 61. It thus appears that the spring-pressed plungers serve to effect an operative engagement between the shaft by which the clutch or head is carried, and the individual gear into the bore of which the head is selectively movable by means hereinafter described. The indents 63 are preferably in the form of a segment of a cylinder and of a trend along or parallel to the axis of the gear so formed.

In the case of units of greater torque requirement, the arrangement of Fig. 12 is to be preferred, according to which the head 64 is characterized by a plurality of radial abutments or arms 65, each laterally and arcuately undercut, as at 66, so as to receive, in seating relation, tangentially arranged pawls 67, the outer ends of which are convexly curved so as to fit within the recesses 66. Each of the pawls 67 is formed with an integral pivot portion, carried within a corresponding journalling recess 68 within one of the gears. Each of the pawls 67 is urged inwardly of the bore in the associated gear as by a spring 69, there being provided for each pawl and its associated spring, a pocket 70 provided with a spring positioning notch 71, the pockets being so proportioned that the pawls 67 may be deflected outwardly of the bore so as to permit a free axial or endwise movement of the head through any given gear. The ends (not shown) of the head 64 are preferably so arranged that as the head approaches the bore of a given gear, the initial effect is to deflect the pawls 67 outwardly, and thus preclude any interference with a free axial or shifting movement of the gear clutch elements.

The train or trains of speed change gears are arranged in two groups, each group being coaxial with one of the shafts 33—35. Those of the first group associated with shaft 33, are indicated in the order of their diameter and number of teeth, at 72, 74, 76, 78 and 80, and mesh respectively and in order with gears 73, 75, 77, 79 and 81. There are thus provided in the example shown, five pairs of gears, the even numbered gears of the one group enmeshing respectively with the odd numbered gears of the companion group. While I have shown for purposes of illustration, five pairs of gears providing a series of graduated gear ratios, it will be understood that any desired practical number of the companion gears may be utilized, according to the required range of speed ratios to be obtained through mechanical control. It will appear from a comparison of diameters of the several sets of paired gears in Fig. 2, that the greatest difference in diameter and hence the greatest reduction or increase in gear ratios, is available between the paired gears 72 and 73; the ratio between the paired gears being less in proceeding through the several pairs, and the minimum mechanical ratio being provided between gears 80 and 81 which are, however, by preference, not identical as to number of teeth.

Referring now to a preferred mechanical agency whereby the two gear clutches or heads 55 and 56 are concurrently shifted, each into one of the selected pair of gears, there is indicated at 85, a worm shaft or screw provided preferably near one end with a pinion such as a bevel pinion 86, (Fig. 2). Enmeshed with the bevel pinion 86 is a bevel gear 87 secured to a shaft 88 journalled at one end in an inwardly extending bearing bracket 89, and at its opposite end in a journal projection 90 (Fig. 6) in one wall of the case 26. The shaft 88 serves to carry a friction wheel 92, provided with a beveled or apexed periphery and adapted to be engaged by a correspondingly grooved arcuate portion 93 of a disc 94, (Figs. 5 and 7). The disc 94 is secured to a shaft 95 projecting outwardly of the transmission case and journalled in a boss 96 in one of the case walls. The outer end of shaft 95 is provided with a crank 97, provided with a handle 98. Thus it appears that, as the crank 97 is actuated within a portion of its circular range of movement, the corresponding rotation of shaft 95, discs 94 and 92 and gear 87, serve to rotate the screw 85.

Positioned for movement axially of the screw or worm shaft 85, is a travelling nut 100 (Fig. 2), forming a central portion of a bracket 101, shiftable endwise of the transmission by means of the parts 85 and 100. The bracket 101 is provided with apertures containing anti-friction bearings 102, on the sleeve associated with shaft 33. and 103 on the sleeve carried by shaft 35. The bearings are kept in place relative to the sleeves as by collars 104 which may be formed integral with the sleeves, together with nuts 105, each engaging the side of the associated bearing opposite the collar 104, and each threadedly secured to the end of the corresponding sleeve.

In order to apprise the operator of the setting of the bracket 101 and hence of the gear clutches 55 and 56, the bracket 101 is provided with an index arm 106 terminating outwardly of the case in a pointer 107, the arm 106 serving to operate through a slot 108, in one wall, say the top, of the case 26. My preference is to provide the opposite sides of the slot 108 with suitable indicia showing, according to each direction of movement of the bracket 101, the various speed positions of the transmission.

Since a unit of the present order is admirably adapted to the driving of machine tools and like equipment, in which a number of definite driving speeds are desired for different operations, it has been found desirable to provide the power take-off shaft 25 with means affording an instantaneous index of its speed. The present example discloses this agency as consisting of a tachometer 110 driven as by a flexible shaft operating in a housing 111 therefor, the shaft being actuated by a bevel pinion 112 from an enmashing gear 113 secured to the shaft 25. The tachometer drive, particularly the gears 112 and 113, is conveniently disposed in a housing 114 therefor, carried by a bracket 115 and secured, say to the end plate 28, of the case 26.

With particular reference to the features distinguishing the present transmission unit, per se, from the heretofore prevailing types of gear transmission units, it is to be noted that, as the screw shaft 85 is rotated and the bracket 101 shifted endwise of and within the case, the gear clutch heads 55 and 56 are always, in the example described, kept in substantially the same vertical plane. Assuming that the heads 55 and 56 are in their operative or clutching positions respectively within the gears 72 and 73, and that the shaft 33 is in the relation of a driving transmission element, the lowest available transmission speed will be imparted to shaft 25. As, however, the bracket 101 is so moved as to bring the heads 55 and 56 within the gears 74 and 75, the speed of shaft 25 will be somewhat increased, other conditions remaining the same, and so on in succession as the clutch heads are moved successively to the left (Fig. 2), into or through the paired, enmeshing, associated gears. When the head 55 occupies the bore of gear 80, and the head 56 the bore of gear 81, the highest possible speed of shaft 25 may be attained when utilizing the shaft 33 as the driving transmission element. It will appear, however, that the situation becomes altered when, by movement of handle 47, shaft 35 becomes the driving, and shaft 33 the driven transmission counter shaft, and that the driving-driven relation of the speed change gears becomes relatively the converse of that described. Assuming gear 80 to be somewhat smaller than gear 81, a still higher output speed now becomes available for the same position of the bracket 101 and heads 55 and 56. In order to obtain a series of successively higher speeds of shaft 25, through the agency of the transmission unit, the handle 98 is turned in a direction opposite to its first described control movement, so as to move the bracket 101 to the right, (Fig. 2), and in turn, the gear clutch heads are moved into the gears 78—79, thence in succession into and through the bores of gears 76—77, 74—75, are again brought within the gears 72 and 73. In this position, the shaft 35 still being the driving shaft, the highest possible speed is available, for power output purposes, to shaft 25.

It will be noted that the axial length of the heads 55 and 56 is less, in each case, than the length of the driving parts of the bores in the individual associated gears, the relation being such that it is impossible for the heads to bridge the gears and thus create any adverse shearing stresses between the gears and shafts.

From the foregoing it will appear that, among other advantages, there result two points of distinct superiority over conventional transmissions, viz., for a given position of the controls identified with the placement of bracket 101, only a single pair of the speed change gears are operative as power transmitting elements. The remaining gears of the speed ratio train being static, are not frictionally absorbing the input energy and are not further dissipating this energy in the displacement, say of a heavy gear case lubricant. A second distinct advantage results in the fact that, contrary to prevailing practice, through the means for varying the driving-driven relations of the shafts 33 and 35, a group, say of five enmeshing pairs of gears, provides double that number of successive speed ratios; in the present example ten such ratios being afforded by the five pairs of gears. The unit is thus rendered very compact and the space requirements of the parts kept at a minimum.

It will be noted that the speed ratio gears are, in a measure, self-journalling, due to their lateral projections of staggered diameter according to which each of the gears of the train is journalled partly in or upon its companion, the groups of the train as a whole being journalled in and positioned by a plurality of spaced parallel brackets 116, 117, 118 and the plate 38.

It will have appeared that the speed change unit 24, employing any reasonable number of speed change gears, will provide a series of graduated speed ratios between the shafts 23 and 25. In case it is desired to effect a greater variation of speeds of the power take-off shaft, it is my preference to utilize an electrical control unit, which is coordinated with the mechanical speed change control of the transmission so as directly to affect the speed of the motor 16. A more complete description of such an electrical control appears in my copending application above referred to, being presently described merely for completeness and in order further to illustrate the applicability of the transmission unit for use with an electric motor.

In the example illustrated the electrical control includes a cam 120, keyed to shaft 95, which is actuated by handled crank 97. The cam 120 is engaged by a roller 121, carried by an arm 122, pivoted at 123 and urged by a spring 124 so that the roller is always kept against the face of the cam 120. The arm 122 is secured, as by a screw 126, to the shaft 123, this shaft being provided with a bearing 127, beyond which the shaft receives a control lever 128 formed of insulating material or provided with an insulated end 129 which serves to carry movable contacts 130. The contact carrying end of arm 128 projects through a slot in an insulating housing indicated at 131 and serving to enclose a contact 132 (Fig. 9) and a plurality of button contacts 133 which may be carried by an insulating base 134. Interconnection of the contact 132 and the several contacts 133, by the element 130, as the arm is moved, serves gradually to increase or decrease the resistance as through rheostat 20 in the motor feeder circuit 18. The variable resistance illustrated at 20 is intended only to be illustrative of a variety of types of electrical speed control. When employed with motors of certain types, a variable inductance such as shown diagrammatically by Fig. 14 has been found more desirable. In the latter case the control arm 128 may be pivotally connected to a movable core which, due to the movement of the arm, will serve to vary the inductive relation between the core element or elements 135 and the associated windings 136.

It will appear from the angular relation of the grooved perimeter 93 of disc 94 and the nose of cam 120, that as the crank 97 is moved from a starting position, the first effect will be, as the disc 92 is rotated, to shift the bracket 101, and hence the gear clutch heads 55 and 56 into one of the paired gears of the transmission unit. Following this, as the groove 93 moves away from the disc 92, a continued partial rotation of the disc leaves the gear change members in their setting. A further half revolution of the disc 94 causes cam 120 to displace the shaft 123 and with it, the arm 128. The contact arm is thus moved from one extreme of its range to the other, during which movement the motor is electrically accelerated to provide any required speed of shaft 25 between those graduated speeds afforded by succeeding control placements of heads 55 and 56 in the transmission gears.

It thus appears that as the control crank is rotated in a given direction, there results a sequence of speed change control movements intervened by a series of motor speed control movements.

In proceeding in order through the ten available speed change ratios available by reason of the gearing of the example disclosed, bracket 101 will first be moved from right to left (Fig. 2), employing shaft 33 as a driving shaft. Thereafter crank 97 will be reversed, and the bracket 101, together with heads 55 and 56 is moved from left to right, employing shaft 35 as a driving shaft through change in position of lever 47. There is thus afforded an infinite variety of speeds between prescribed limits, of the power take-off shaft 25.

In certain installations requiring a frequent transition from a low driving speed to a very high speed, the full cyclic actuation of the rheostat or inductance between the several steps of transmission control is rendered unnecessary. In such case cam 120 may be provided with a clutch (not shown), for readily disconnecting it from the control shaft, or in lieu thereof, a switch 140 (Fig. 1) may be employed to shunt out the electrical control during the period of progressing through a number of speed change ratios.

In operation it will appear that, the operator having noted the direction of movement of bracket 101 as last effected by the crank 97 considered in connection with the position of handle 47, he is enabled by virtue of the direction-indicating arrows and indices of Fig. 13, to follow one or the other of the scales along the slot 108. The arrows and the speed ratio indication as coordinated with the position of pointer 107, apprises the operator of the internal control placements of the transmission unit, necessary to approximate the desired speed of shaft 25. If the tachometer does not show the specifically desired speed of shaft 25, this may then be obtained by manipulation of the crank 97 to vary either the rheostat or the variable inductance to a degree resulting in any desired rate of rotation of shaft 25 within the end limits resulting from any given control placement of the transmission.

The description thus far is predicated on a structure in which shaft 23 may either constitute the motor shaft, or be directly driven thereby. It is, however, desirable in certain installations, to provide for a full range of speed control for either direction of rotation of the power input shaft. To this end I have provided a reversing gear unit of simple construction, best appearing in assembly in Fig. 15. This unit includes a case extension 150 constituting a housing which may be secured by bolts to end plate 27 of the case 26. The motor shaft or shaft extension 151 is journalled in a bearing boss 152 of the housing 150, and is provided internally of the case with a spline or key 153, upon which is slidably mounted a sleeve 154. This sleeve serves to carry at its inner end a bevel gear 155 and one element 156 of a jaw or dog type clutch, the companion element 157 of which is carried by a companion bevel gear 158 secured as by a pin 159 to the shaft 23. A reversing pinion 160 serves selectively to interconnect the gears 155 and 158, the pinion 160 being rotatably and slidably mounted on a vertical stub shaft 161, secured as by a pin 162 in a boss 163 of the casing 150.

It will be observed that the shafts 151 and 23 are positively connectable through the agency of the clutch elements 156 and 157, and connected for reverse rotation through gears 155, 160 and 158. To the end of effecting either a direct drive or reversing connection between the shafts, I have provided a handled lever 164 pivoted on a pin 165, carried by a projection 166 within the case 150. The lever 154 is provided with two forked arms, 167 and 168. The arm 167 pivotally engages lugs 169 projecting from a non-rotatable collar 170 exteriorly embracing flange 171 on the hub portion of the pinion 160. The arm portion 168 engages like projections 172, carried by a non-rotatable collar 173 surrounding a flange 174 on the sleeve 154.

The lengths and angular spacing of the arms 167 and 168 are such that it is impossible to engage concurrently the pinion 160 and the clutch 156—157. With the lever 164 in its reversing position (Fig. 15), the pinion 160 is in mesh with gears 155 and 158, while the clutch parts are disengaged. When the lever 164 is at the opposite end of a slot 175 provided therefor at the top of case 150 it will be seen that pinion 160 its withdrawn so as to clear the bevel gears, while the sleeve 154 is moved to the right (Fig. 15), sufficiently to engage the clutch parts, and thus to cause shaft 23 to be rotated directly with the shaft 150.

It will appear that the clutch assembly described provides a simple and easily controlled means for reversing the direction of power input to the transmission assembly heretofore described, and thus renders available the full use of its control facilities for either direction of rotation.

It will appear that the entire assembly as described, is of simple and sturdy construction, is dependable in operation and highly efficient, in that it minimizes internal frictional losses, is economical in construction, and fully attains in every respect, each of the several objects above set forth.

While the invention has been described by particularizing the structure of a specific exemplary embodiment, such a description is not to be understood in a limiting sense, since numerous changes may be made in the parts, and in their combinations, as well as in the application or use of the unit, without departing from the full intended scope of the invention as defined by the appended claims.

I claim:

1. In a power plant, a transmission, a prime mover, a pair of transmission shafts, a group of coaxial gears adapted for selective connection with each shaft, control means for selecting a gear-shaft connection to each transmission shaft, and control means for selectively connecting the transmission shafts, one at a time to the prime mover, and concurrently establishing a power take-off connection to the other shaft.

2. In a power plant, a motor, a motor shaft, a speed change unit including a pair of countershafts, a group of gears associated with each shaft, the gears of one of said countershafts cooperating with the gears of the other countershaft for effecting changes in speed ratio through the unit, means for selectively connecting each countershaft to each of the associated gears and independent means for selectively connecting the countershafts to the said motor shaft.

3. In a power plant, a motor, a motor shaft, a transmission including a pair of countershafts, a group of gears coaxial with each of said countershafts, the gear groups being enmeshed, control means for selectively connecting each countershaft with one gear of the associated group, control means for selectively connecting the countershafts to the motor shaft, a power take-off shaft, and a device operable by the last said control means for connecting either of said countershafts to the take-off shaft, as the other thereof is connected to said motor shaft.

4. A transmission unit including a pair of countershafts, a group of gears associated with each shaft in operative relation to those associated with the other shaft, a power input member, and control means for selectively actuating either of said shafts, by the input member, as a driving transmission element while utilizing the other shaft as a driven transmission element.

5. In a transmission, a pair of transmission shafts, speed change gears associated with each of said shafts, the gears of each shaft being enmeshed with gears of the other shaft, a power input gear, a power take-off gear, auxiliary gearing on each shaft, engageable selectively with the last said gears, and control means associated with the input and take-off gears, said control means being adapted to effect selective operative connection of the input gear with either of said shafts and concurrent operative connection of the take-off gear with the other of said shafts.

6. A speed change transmission including a drive shaft, two groups of speed-change gears, those of each group being coaxially disposed and provided with a bore therethrough to receive a countershaft, a countershaft for each gear group, gear-shaft-clutching means operable within each of said bores, a control member movable axially of both shafts, and connected to the said clutching means, means for shifting said control member to effect selective concurrent placements of said clutching means, and gear elements for selectively connecting said countershafts to the drive shaft.

7. In a speed change unit, a group of coaxial speed-change gears, a second group of coaxial speed-change gears enmeshed with those of the first group, a pair of countershafts, one for each of the said gear groups, gear clutches associated with the countershafts, a common control member for said gear clutches, adapted for concurrently effecting an operative connection to the countershafts, of predetermined paired gears of the different groups, and concurrently excluding from operating connection from the countershafts, the remaining gears of the groups, a drive shaft, a gear thereon, a drive gear on each countershaft, and means for selectively engaging the last said gears with the drive shaft gear.

8. A transmission unit including a pair of countershafts, a group of speed-change gears associated with each countershaft, the gears of each group being in mesh with companion gears of the other group, a control member operable for selectively connecting paired gears of opposite groups to the associated countershafts, a drive shaft, means for selectively connecting the drive shaft to the countershafts, a power take-off element, and means for selectively connecting the take-off element to said countershafts.

9. A transmission unit including a pair of countershafts, a group of speed-change gears associated with each countershaft and enmeshing with gears of a companion group on the paired countershaft, a common control member operable for selectively connecting a gear of each group to the associated countershaft, a drive shaft, a gear thereon, a gear on each countershaft, means for selectively engaging the last said gears with the drive shaft gear, a power take-off element, and means for selectively connecting the take-off element to said countershafts.

10. A transmission unit including a pair of countershafts, a group of speed change gears associated with each countershaft, control means for connecting a selected gear of each group to the associated countershaft, said means being operable to connect a companion gear of the other group to its associated countershaft, a drive shaft, means for selectively connecting the drive shaft to the countershafts, a power take-off element, a gear on each countershaft, a gear connected to the power take-off element, and means for selectively engaging said last gear with the said countershaft gears.

11. A speed-change unit including two countershafts, a group of speed-change gears associated with each countershaft, control means for selectively connecting a gear of each group to the associated countershaft, a drive shaft, a gear thereon, a drive gear on each countershaft, means for selectively shifting the drive shaft gear selectively into engagement with the said countershaft gears, a power take-off element, a gear thereon, a driven gear on each countershaft, and means for shifting the said take-off gear into engagement, selectively, with the countershaft driven gears.

12. A transmission unit including a pair of countershafts, a group of speed-change gears associated with each countershaft, control means for selectively connecting a gear of each group to the associated countershaft, a drive shaft, a gear thereon, a power take-off shaft, a gear thereon, a driving gear and a driven gear on each countershaft, and means for concurrently shifting the drive shaft gear into connection with one of the countershaft driving gears, and the power take off gear into connection with one of the countershaft driven gears.

13. In a transmission unit, a pair of countershafts, a group of speed-change gears associated with each countershaft, means for selectively connecting a gear of each group to the associated countershaft, a drive shaft, a drive shaft gear, a drive gear on each countershaft, means for shifting the drive shaft gear into selective engagement with the countershaft drive gears, a power take-off shaft, a driven gear thereon, a driven gear on each countershaft, means for shifting the take-off shaft gear into selective connection with the countershaft driven gears, and an element for concurrently actuating the said gear-shifting means.

14. In a transmission unit, a pair of countershafts, a group of speed change gears associated with each countershaft, means for selectively connecting a gear of each group to the associated countershaft, a drive shaft, a drive shaft gear, a drive gear on each countershaft, the drive shaft gear being shiftable into selective engagement with the countershaft drive gears, a power take-off shaft, a driven gear thereon, a driven gear on each countershaft, the take-off shaft gear being shiftable into selective connection with the countershaft driven gears, and means for concurrently shifting the drive shaft gear and the take-off shaft gear, there being a connection between the elements for shifting the last said gears, and adjusting means associated with said connection adapted to permit variation of the relative position of said gears with respect to the said countershaft gears.

EUGENE S. BUSH.